(12) United States Patent
Gupta et al.

(10) Patent No.: US 11,972,245 B2
(45) Date of Patent: Apr. 30, 2024

(54) PROACTIVE PREVENTION OF DATA UNAVAILABILITY AND DATA LOSS

(71) Applicant: Dell Products L.P., Round Rock, TX (US)

(72) Inventors: Kaushik Gupta, Pune (IN); Shiv Kumar, Pune (IN); Jai Gahlot, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 105 days.

(21) Appl. No.: 17/660,737

(22) Filed: Apr. 26, 2022

(65) Prior Publication Data

US 2023/0342135 A1      Oct. 26, 2023

(51) Int. Cl.
| | |
|---|---|
| *G06F 8/65* | (2018.01) |
| *G06F 8/71* | (2018.01) |
| *G06F 9/445* | (2018.01) |
| *G06F 21/57* | (2013.01) |
| *G06F 21/60* | (2013.01) |
| *G06F 21/62* | (2013.01) |

(52) U.S. Cl.
CPC .............. *G06F 8/65* (2013.01); *G06F 21/629* (2013.01)

(58) Field of Classification Search
CPC .................................. G06F 8/65; G06F 21/629
See application file for complete search history.

(56) References Cited

U.S. PATENT DOCUMENTS

| | | | | |
|---|---|---|---|---|
| 11,487,528 B1* | 11/2022 | Spiegelman | .............. | G06F 8/71 |
| 2018/0067736 A1* | 3/2018 | De Zaeytijd | .............. | G06F 8/65 |
| 2021/0056207 A1* | 2/2021 | Tiwari | ...................... | G06F 8/65 |

OTHER PUBLICATIONS

Konstanting Shvachko et al., The Hadoop Distributed File System, 2010 IEEE, [Retrieved on Sep. 27, 2023]. Retrieved from the internet: <URL: https://ieeexplore.ieee.org/stamp/stamp.jsp?tp=&arnumber=5496972> 10 Pages (1-10) (Year: 2010).*

* cited by examiner

*Primary Examiner* — Anibal Rivera
(74) *Attorney, Agent, or Firm* — Amin, Turocy & Watson, LLP

(57) ABSTRACT

A system can maintain information indicative of prohibited computer operations, wherein the information is accessible to respective computing clusters of a group of computing clusters, and wherein the information is stored separately from the group of computing clusters. The system can obtain, by a service of a first computing cluster of the group of computing clusters, the information. The system can, in response to receiving, at the first computing cluster, a request to perform an operation on a first computer of the first computing cluster, in response to determining, based on the information, that the operation is prohibited, prevent the operation from occurring; and, in response to determining, based on the information, that the operation is not prohibited, permit the operation to occur.

20 Claims, 11 Drawing Sheets

300

304

| Prevent | On Version | To Version | Condition | Error String for Customer |
|---|---|---|---|---|
| Upgrade | X | Y | - | Upgrade not supported from X to Y |
| Upgrade | X | Y | If service R is running | Upgrade not supported from X to Y if service R is enabled |
| Service S | P | - | If service R is running | Cannot enable service S if service R is running. |

| Disable Check | Prevent | On Version | To Version | Condition | Error String for Customer |
|---|---|---|---|---|---|
| True | Upgrade | X | Y | - | Upgrade not supported from X to Y |
| False | Upgrade | X | Y | If service R is running | Upgrade not supported from X to Y if service R is enabled |
| False | Service S | P | - | If service R is running | Cannot enable service S if service R is running. |

PROACTIVE PREVENTION OF DATA UNAVAILABILITY AND DATA LOSS

BACKGROUND

Computer storage systems can store computer data. Data unavailability can generally refer to data that is stored on a computer storage system being inaccessible for a period of time. Data loss can generally refer to data that is stored on a computer storage system being lost and unrecoverable from that storage system.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain information indicative of prohibited computer operations, wherein the information is accessible to respective computing clusters of a group of computing clusters, and wherein the information is stored separately from the group of computing clusters. The system can obtain, by a service of a first computing cluster of the group of computing clusters, the information. The system can, in response to receiving, at the first computing cluster, a request to perform an operation on a first computer of the first computing cluster, in response to determining, based on the information, that the operation is prohibited, prevent the operation from occurring; and, in response to determining, based on the information, that the operation is not prohibited, permit the operation to occur.

An example method can comprise receiving, by a service of a first computing cluster of a group of computing clusters, information from a remote computer, wherein the information is indicative of prohibited computer operations, and wherein the information is accessible to respective computing clusters of the group of computing clusters. The method can further comprise, in response to receiving, at the first computing cluster, a request to perform an operation on a first computer of the first computing cluster, in response to determining, based on the information, that the operation is prohibited, preventing the operation from occurring; and, in response to determining, based on the information, that the operation is not prohibited, permitting the operation to occur.

An example non-transitory computer-readable medium can comprise instructions that, in response to execution, cause a system comprising a processor to perform operations. These operations can comprise fetching, by the computing service, information from a remote device, wherein the information is indicative of prohibited device operations. The operations can further comprise in response to receiving, at the computing service, a request to perform an operation on a first device, in response to determining, based on the information, that the operation is prohibited, preventing the operation from occurring; and in response to determining, based on the information, that the operation is not prohibited, permitting the operation to occur.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates an example table on preventing operations that can be maintained by a server, and that can facilitate proactive prevention of data unavailability and data loss, in accordance with an embodiment of this disclosure;

FIG. 4 illustrates an example table on preventing operations that can be maintained by a client, and that can facilitate proactive prevention of data unavailability and data loss, in accordance with an embodiment of this disclosure;

DETAILED DESCRIPTION

Overview

Figure 1:
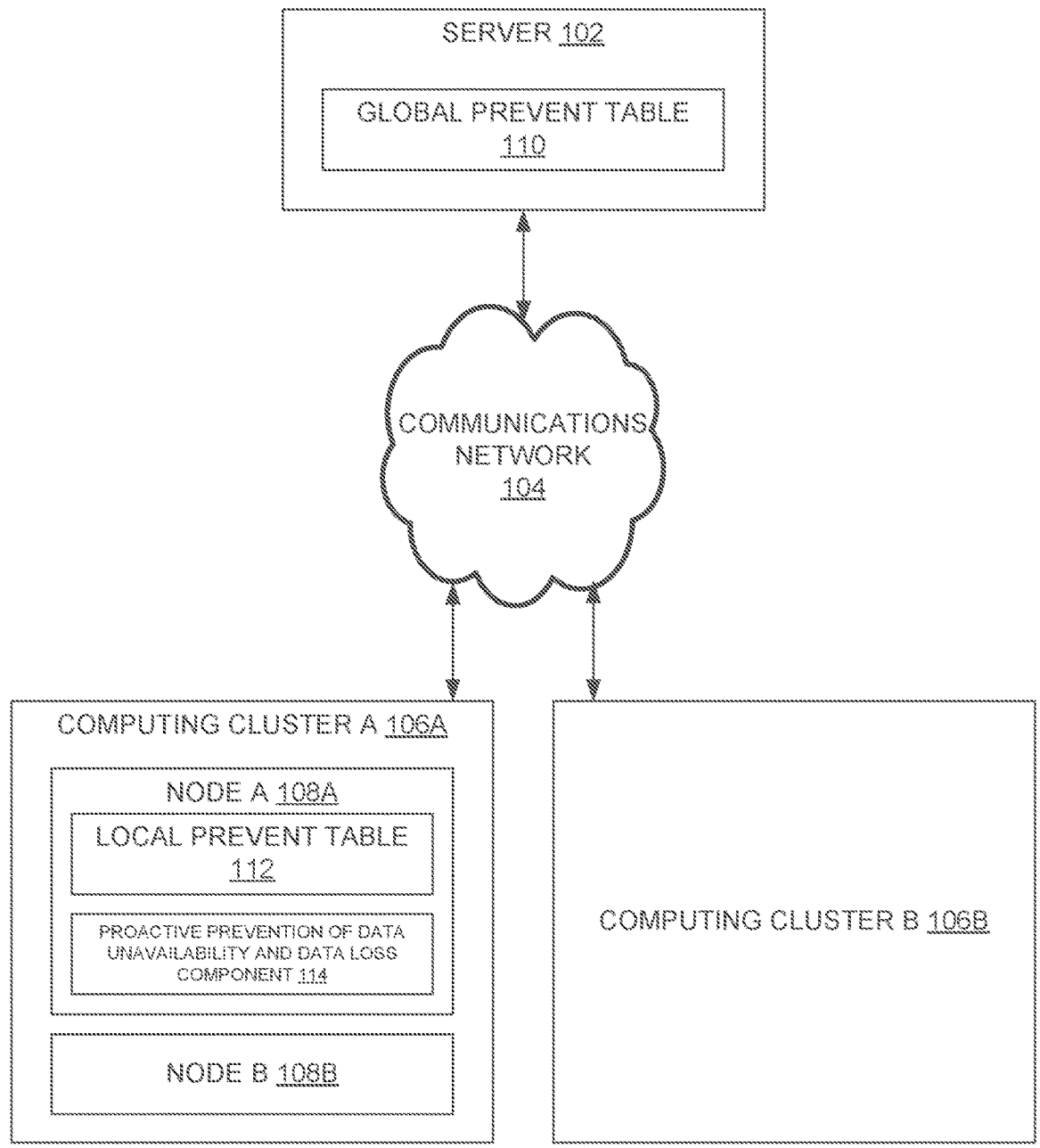
FIG. 1 illustrates an example system architecture that can facilitate proactive prevention of data unavailability and data loss, in accordance with an embodiment of this disclosure.

There can be a problem with data unavailability and data loss (sometimes referred to as "DuDl"). It can be that there is not a mechanism to proactively prevent data unavailability and data loss. A result of this can be found in the following example. A computing cluster with User A can experience data unavailability and data loss for a given configuration. It can be that there is not a way to prevent User B with another computing cluster (having a same version and configuration of programs on cluster nodes) from experiencing the same issue.

A computing cluster can generally comprise a group of computers (sometimes referred to as nodes) that operate in concert, such that the computing cluster can logically be considered to be one computing device. While the examples herein generally involve a computing cluster architecture, it can be appreciated that the present techniques can more generally be applied to computers in a variety of scenarios.

In some examples, a reason for data unavailability and data loss can be an upgrade, or a configuration change that is not supported on a current version, and can result in data unavailability and/or data loss.

In an example, an issue with a computing cluster can cause data unavailability and data loss. An administrator of the computing cluster can work on the issue and release a patch for users, so that the users can access their data again. In the meantime, users can also be provided a workaround (to mitigate against an impact of the data unavailability and data loss) until the patch is available. However, it can be that there is no automated process in place to protect users on other computing clusters that are running a same software configuration as the affected computing cluster.

In another example, an engineering team can discover a bug in computer code after releasing a corresponding program. The engineering team can determine that a fix for the bug will go in a next patch. While this bug can lead to data unavailability and data loss, it can be that there is not an automated process to proactively prevent data unavailability and data loss.

That is, it can be that there is not a way to mark a configuration or upgrade from a specific configuration as risky, and automatically notify all associated computing clusters about this risky configuration.

A solution to these problems of data unavailability and data loss can be to maintain information about risky configurations, upgrades, and other operations for multiple clusters, send this information to individual clusters, where the individual clusters identify configurations, upgrades, and other operations deemed risky.

The present techniques can be similar to anti-virus approaches. Anti-virus approaches can generally synchronize a local group of antivirus signatures with a global database that contains signatures of known viruses. An on-node antivirus service can fetch the known virus signatures and scan on-node files against these signatures. The global database can be updated with known virus signatures when they are detected.

The present techniques can be distinguished from anti-virus approaches. That is, according to the present techniques, where a certain operation for a certain computer configuration can cause a DaDl event, then that operation can be prevented. In contrast, anti-virus techniques can scan through files and raise a file as a threat (or clear the file from being considered a threat) where a signature of the file matches a threat signature.

Anti-virus techniques can implement servers to detect a virus. A global server can store threat signatures. Then, an on-client module can scan files on a client system and match a signature of a file with a threat signature. That can be distinguished from the present techniques, where infrastructure is provided to prevent a user from performing an operation.

The present techniques can be implemented to utilize a global server that has data related to operations that should be prevented. The examples herein generally relate to upgrading programs, or changing a configuration (e.g., starting to run a particular service). It can be appreciated that the present techniques can be more generally applied to prohibiting certain operations that can lead to data unavailability and data loss, such as protocol driver operations, or operations relating to running a particular job.

In some examples, each cluster can have a data unavailability and data loss service running (if enabled). The data unavailability and data loss service can fetch a global prevent table from a global server. Requests to perform particular types of operations, such as upgrades and configurations, can refer to a local copy of the prevent table. Where the prevent table indicates that the particular action is prohibited, an error string in the prevent table can be displayed to a user account associated with requesting the operation.

The present techniques can be implemented for protocol operations (e.g., with filter driver hooks). The present techniques can also be implemented for jobs (e.g., by hooking a job engine with the prevent table).

Consider an example where the present techniques are applied to an operation that is an upgrade for a computing cluster. In some examples, rolling upgrades can be implemented, where one node in a cluster is upgraded at a time. This can be implemented so that some nodes are available for providing computing resources even while an upgrade is ongoing. Once all nodes in a cluster are upgraded, the upgrade can be committed. Until an upgrade is committed, it can be rolled back to a previous release.

An upgrade can be initiated by an administrator account associated with the cluster. When the administrator account requests an upgrade (which can be a form of an operation), the request can be hooked with the prevent table. The request can be checked to see if the associated operation is allowed. Where not allowed, the request can fail. Where allowed, the request can be processed.

It can be appreciated that an upgrade can be one type of operation that the present techniques are applied to, and that there can be other types of operations that the present techniques can be applied to.

Example Architectures

FIG. 1 illustrates an example system architecture 100 that can facilitate proactive prevention of data unavailability and data loss, in accordance with an embodiment of this disclosure.

System architecture 100 comprises server 102, communications network 104, computing cluster A 106A, computing cluster B 106B, node A 108A, node B 108B, global prevent table 110, local prevent table 112, and proactive prevention of data unavailability and data loss component 114.

Figure 11:
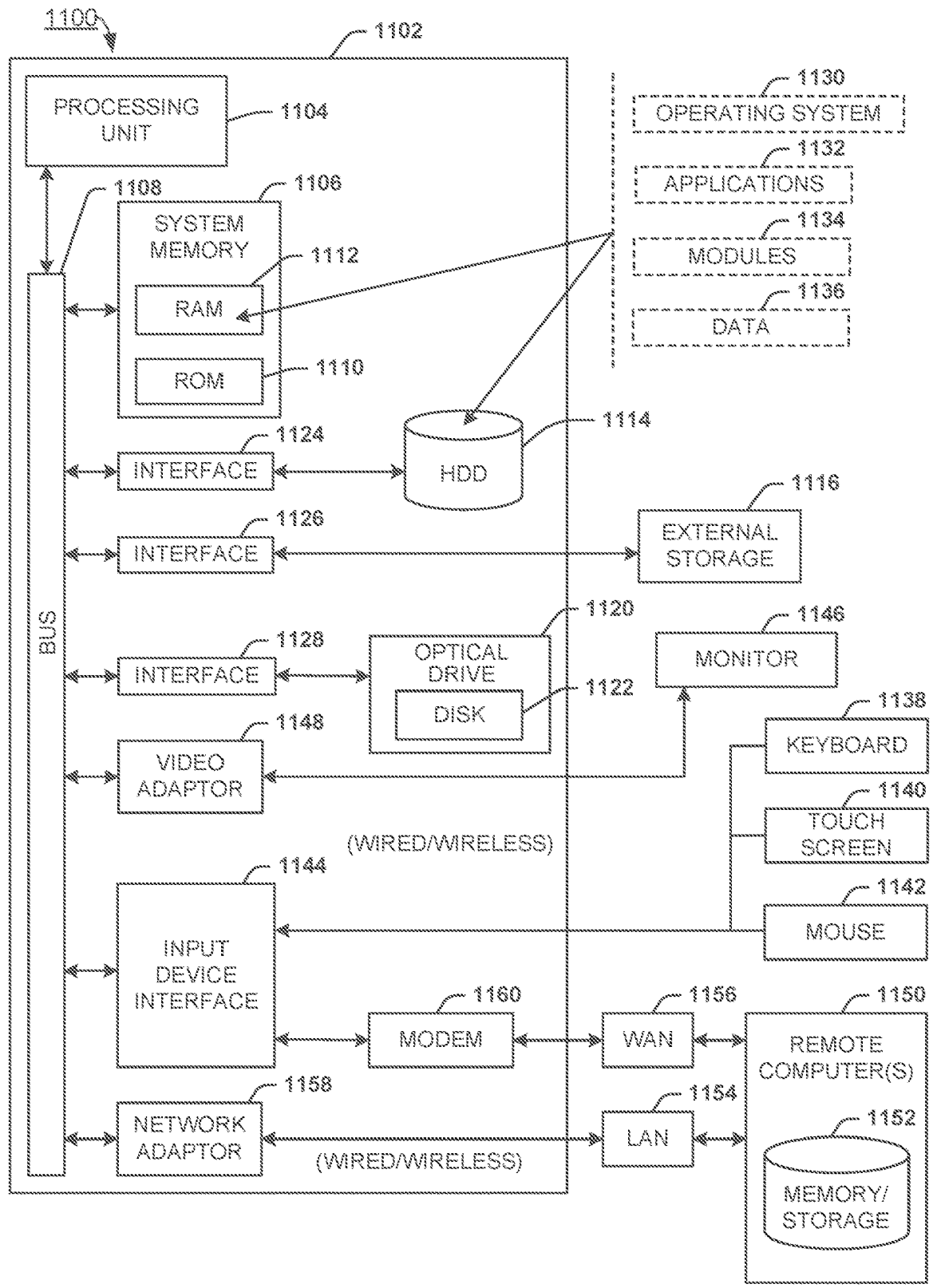
FIG. 11 illustrates an example block diagram of a computer operable to execute an embodiment of this disclosure.

Each of server 102, computing cluster A 106A, computing cluster B 106B, node A 108A, and node B 108B can be implemented with part(s) of computing environment 1100 of FIG. 11. Communications network 104 can comprise a computer communications network, such as the Internet.

Server 102 can maintain global prevent table 110, which can comprise data that indicates prohibited operations under certain conditions (e.g., upgrading from one specified version of a program to another specified version when a service is configured to run). Server 102 can update global prevent table, such as based on information received regarding cluster B 106B. For example, cluster B 106B can experience data unavailability and data loss as a result of performing a particular upgrade, so this upgrade can be added to global prevent table 110.

Server 102 can send a copy of global prevent table 110 to proactive prevention of data unavailability and data loss component 114, which can store this information as local prevent table 112. In some examples, local prevent table 112 is not a duplicate of global prevent table 110.

For example, global prevent table 110 can be recently updated, and that update is not yet shared with proactive prevention of data unavailability and data loss component 114 for local prevent table 112. In other examples, proactive prevention of data unavailability and data loss component 114 can augment local prevent table 112 with information about whether to enable a particular prohibited operation for cluster A 106A.

Proactive prevention of data unavailability and data loss component 114 can maintain local prevent table 112 for all nodes of cluster A 106A. That is, when cluster A 106A attempts to perform an operation for all of its nodes, or for a particular node that does not store local prevent table 112 (e.g., node B 108B), local prevent table 112 can be accessed to see if this operation is prohibited.

In some examples, proactive prevention of data unavailability and data loss component 114 can implement part(s) of the process flows of FIGS. 5-10 to facilitate proactive prevention of data unavailability and data loss.

It can be appreciated that system architecture 100 is one example system architecture for proactive prevention of data unavailability and data loss, and that there can be other system architectures that facilitate proactive prevention of data unavailability and data loss.

Furthermore, it can be appreciated that different computing clusters can comprise more or fewer nodes than is depicted.

Figure 2:
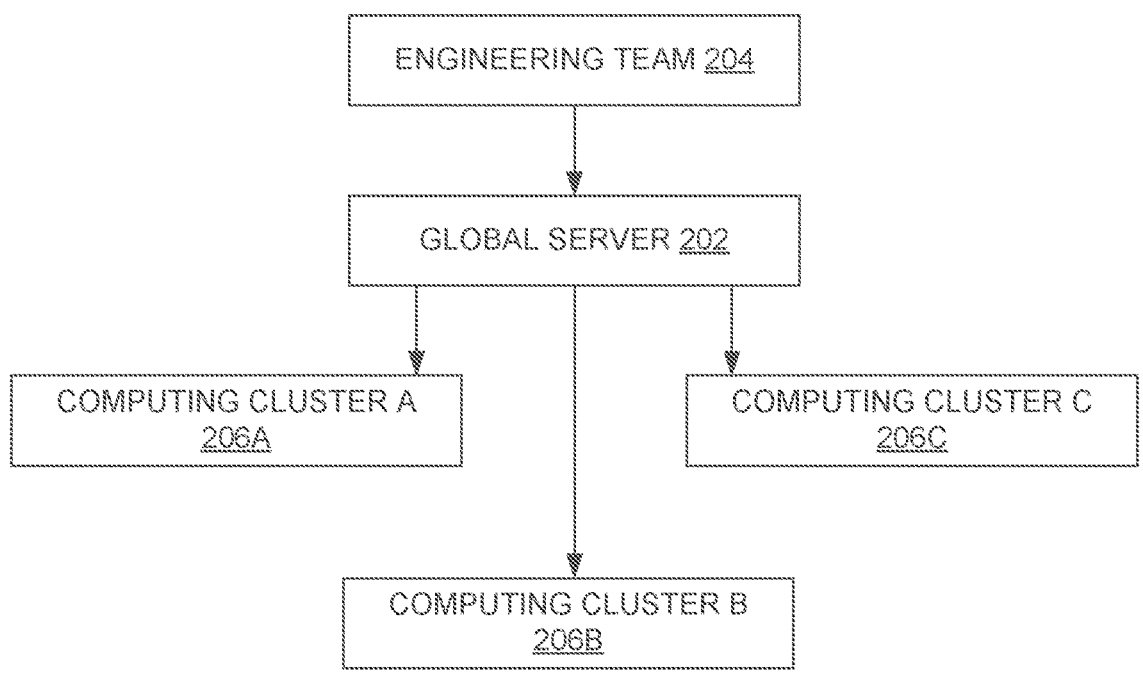
FIG. 2 illustrates another example system architecture that can facilitate proactive prevention of data unavailability and data loss, in accordance with an embodiment of this disclosure.

FIG. 2 illustrates another example system architecture 200 that can facilitate proactive prevention of data unavailability and data loss, in accordance with an embodiment of this disclosure.

System architecture 200 can be used to populate a global prevent table at a server level, and further propagate the server's global prevent table to multiple clusters. In some examples, system architecture 200 can be implemented to perform these functions for system architecture 100 of FIG. 1.

System architecture 200 comprises global server 202 (which can be similar to server 102 of FIG. 1); engineering team 204 (which can be an entity with authority to modify a global prevent table maintained by global server 202); and computing cluster A 206A, computing cluster B 206B, and computing cluster C 206C (which can each be similar to an instance of computing cluster A 106A and/or computing cluster B 106B).

In system architecture 200, engineering team 204 can create and/or modify a global prevent table at global server 202. Global server 202 can send instances of this global prevent table to each of computing cluster A 206A, computing cluster B 206B, and computing cluster C 206C. Each of computing cluster A 206A, computing cluster B 206B, and computing cluster C 206C can then use their respective copy of the prevent table (which can be referred to as a local prevent table) to prohibit certain operations from being performed with their respective cluster.

In some examples, global server 202 can push a copy of the prevent table to each of computing cluster A 206A, computing cluster B 206B, and computing cluster C 206C when the prevent table is updated, or a set amount of time has passed since global server 202 last pushed a copy of the prevent table to computing cluster A 206A, computing cluster B 206B, and computing cluster C 206C. In other examples, computing cluster A 206A, computing cluster B 206B, and computing cluster C 206C can each periodically fetch a copy of the prevent table from global server 202, such as on a schedule, or when encountering a type of operation that is not covered by the current local copy of the prevent table.

Example Tables

FIG. 3 illustrates an example table 300 on preventing operations that can be maintained by a server, and that can facilitate proactive prevention of data unavailability and data loss, in accordance with an embodiment of this disclosure.

Table 300 can be similar to global prevent table 110 of FIG. 1.

Table 300 comprises rows 302 and columns 304. Each row of rows 302 specifies a separate operation that is prevented. Columns 304 then contains information about each operation identified in rows: prevent (e.g., a type of operation prevented), on version (e.g., a starting version of a program where the operation is an upgrade, or a current version of a program where the operation is a service to configure), to version (e.g., a version that the program would be upgraded to where the operation is an upgrade), condition (e.g., an additional condition that, if true, indicates that the operation is prohibited), and error string for customer (e.g., a message to transmit to a user account associated with requesting to perform the operation).

It can be appreciated that in some examples not all columns have data for a particular row. For example, it can be that identifying a condition for a particular operation is optional.

FIG. 4 illustrates an example table 400 on preventing operations that can be maintained by a client, and that can facilitate proactive prevention of data unavailability and data loss, in accordance with an embodiment of this disclosure.

Table 400 can be similar to local prevent table 112 of FIG. 1, and can comprise a version of table 300 of FIG. 3 that is stored locally (e.g., by proactive prevention of data unavailability and data loss component 114).

Table 400 comprises rows 402 (which can be similar to rows 302 of FIG. 3) and rows 404.

A difference between table 400 and table 300 is that table 300 can contain the column disable check. This column can indicate whether a particular row is disabled locally (as indicated by True). Where a particular row is disabled locally, the indicated operation is not prohibited locally.

A reason for local disabling of a prohibition can be that an administrator of the associated computing cluster (e.g., computing cluster A 106A) can maintain ultimate control over that cluster, and has decided that the benefit of performing that operation outweighs an associated risk of data unavailability and data loss.

Example Process Flows

Figure 5:
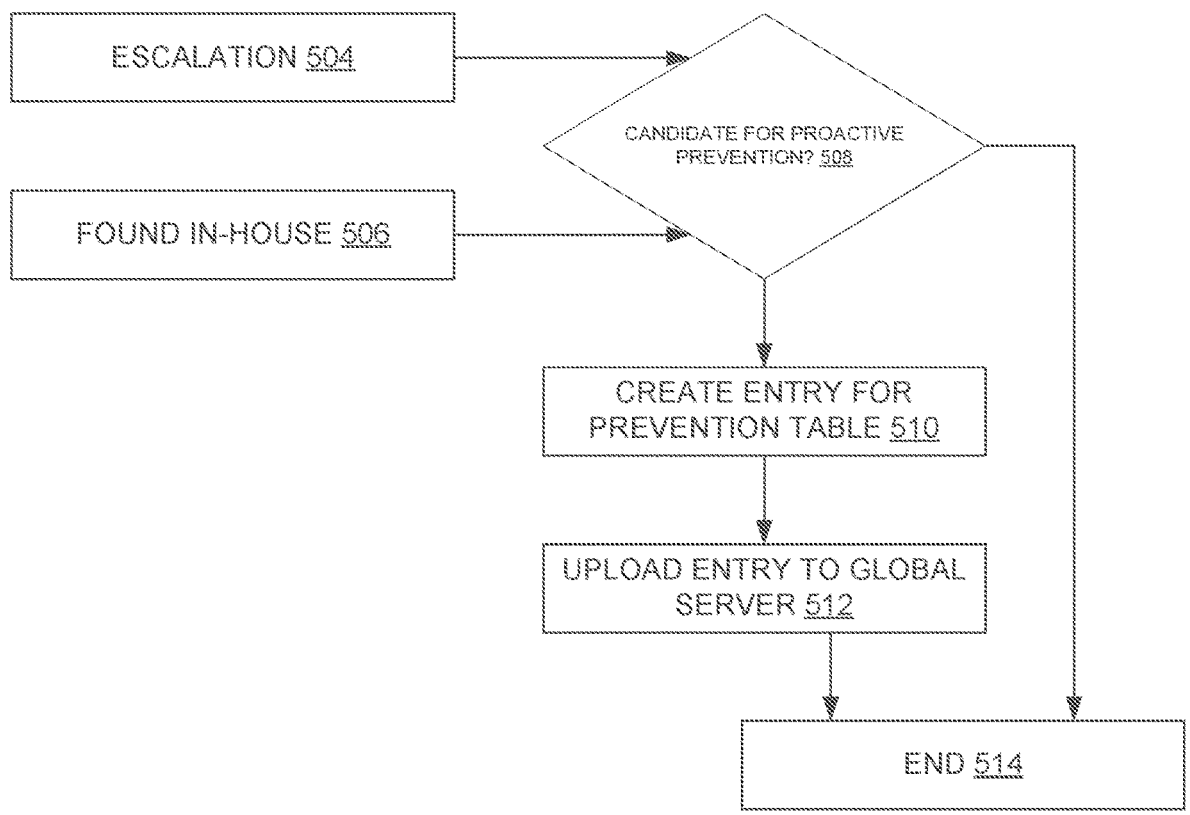
FIG. 5 illustrates an example process flow that can facilitate prevention of data unavailability and data loss, in accordance with an embodiment of this disclosure.

FIG. 5 illustrates an example process flow 500 that can facilitate prevention of data unavailability and data loss, in accordance with an embodiment of this disclosure.

In some examples, one or more embodiments of process flow 500 can be implemented by proactive prevention of data unavailability and data loss component 114 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 600 of FIG. 6, process flow 700 of FIG. 7, process flow 800 of FIG. 8, process flow 900 of FIG. 9, and/or process flow 1000 of FIG. 10.

Process flow 500 begins with operation 504 and/or operation 506. Operation 504 depicts escalation. This can indicate that a problem with a particular operation has been identified by a user, and an engineering team responsible for maintaining a global prevent list can have been notified of it.

After operation 504, process flow 500 moves to operation 508.

Operation 506 depicts found in-house. This can indicate that a problem with a particular operation has been identified by an engineering team responsible for maintaining a global prevent list.

After operation 506, process flow 500 moves to operation 508.

Operation 508 depicts determining whether the problem is a candidate for proactive prevention. Where it is determined in operation 508 that the problem is a candidate for proactive prevention, process flow 500 moves to operation 610. Instead, where it is determined in operation 508 that the problem is not a candidate for proactive prevention, process flow 500 moves to 514, where process flow 500 ends.

An example of a problem that is a good candidate for proactive prevention can be an upgrade from version X to version Y where feature F is turned on. This can be a good candidate for proactive prevention because it comprises a fixed pattern that can be identified and fed to a prevent table.

In some examples, it can be that some problems are not as good candidates for proactive prevention. For example, a memory leak that causes a system slowdown, where the leak's effect can be visible after prolonged use of Networked File System (NFS) protocol input/output (I/O). It can be that a definition of prolonged use varies from system to system, so can be difficult to track.

Operation 510 is reached from operation 508 where it is determined in operation 508 that the problem is a candidate for proactive prevention. Operation 510 depicts creating an entry for the prevention table. This can be similar to a row of table 300 of FIG. 3.

After operation 510, process flow 500 moves to operation 512.

Operation 512 depicts uploading the entry to a server. Using the example of FIG. 1, the server can be server 102, and the entry can be uploaded, and merged with global prevent table 110.

After operation 512, process flow 500 moves to 514, where process flow 500 ends.

Figure 6:
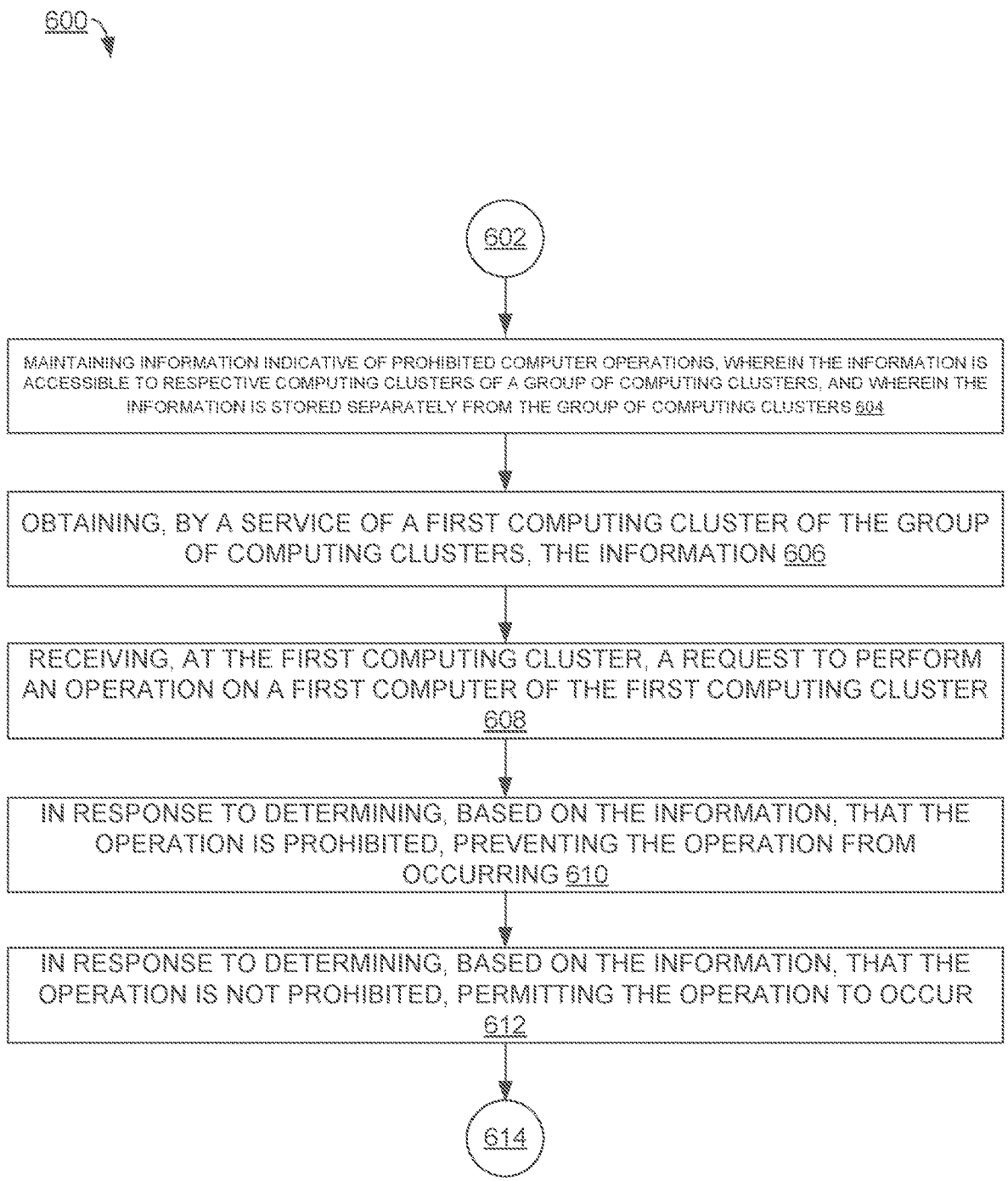
FIG. 6 illustrates an example process flow that can facilitate prevention of data unavailability and data loss, in accordance with an embodiment of this disclosure.

FIG. 6 illustrates an example process flow 600 that can facilitate prevention of data unavailability and data loss, in accordance with an embodiment of this disclosure.

In some examples, one or more embodiments of process flow 600 can be implemented by proactive prevention of data unavailability and data loss component 114 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604. Operation 604 depicts maintaining information indicative of prohibited computer operations, wherein the information is accessible to respective computing clusters of a group of computing clusters, and wherein the information is stored separately from the group of computing clusters.

After operation 604, process flow 600 moves to operation 606. That is, using the example of system architecture 100 of FIG. 1, server 102 can store global prevent table 110.

Operation 606 depicts obtaining, by a service of a first computing cluster of the group of computing clusters, the information. Continuing with the example of FIG. 1, that is, proactive prevention of data unavailability and data loss component 114 can obtain a copy of global prevent table 110, and store it as local prevent table 112.

In some examples, the information indicates a condition under which the operation is prohibited. This can be information stored in "condition" in columns 304 of table 300 of FIG. 3.

In some examples, the service is a first service, and wherein the condition is a second service that is running on the first computer. Using the example of FIG. 3, the condition can be "If service R is running."

In some examples, the information indicates that the operation is prohibited, and the information indicates a message to convey to a user account that initiated the operation. This can be information stored in "error string for customer" in columns 304 of table 300 of FIG. 3.

After operation 606, process flow 600 moves to operation 608.

Operation 608 depicts receiving, at the first computing cluster, a request to perform an operation on a first computer of the first computing cluster. This can be an operation originated within the cluster, such as a request to upgrade an operating system of nodes of the cluster (e.g., node A 108A and node B 108B of FIG. 1).

In other examples, this can be a request that is originated external to the cluster. For example, where a cluster stores data and provides remote access to the data, the request can be to perform a protocol operation to access the data (e.g., a server message block (SMB) protocol operation to write data on the cluster).

In some examples, the operation comprises upgrading from a first version of a program on the first computer to a second version of the program on the first computer.

In some examples, the service is a first service, and the operation comprises instantiating a second service on the first computer.

After operation 608, process flow 600 moves to operation 610.

Operation 610 depicts, in response to determining, based on the information, that the operation is prohibited, preventing the operation from occurring. Using the example of FIG. 1, proactive prevention of data unavailability and data loss component 114 can access local prevent table 112 to determine if the particular operation is prohibited. Where the operation is prohibited, proactive prevention of data unavailability and data loss component 114 can prevent the operation from occurring, or otherwise ensure that the operation is not carried out.

In some examples, the operation is prohibited because performing the operation results in data unavailability and/or data loss.

After operation 610, process flow 600 moves to operation 612.

Operation 612 depicts, in response to determining, based on the information, that the operation is not prohibited, permitting the operation to occur. Similar to in operation 612, and using the example of FIG. 1, proactive prevention of data unavailability and data loss component 114 can access local prevent table 112 to determine if the particular operation is prohibited. Where the operation is not prohibited, proactive prevention of data unavailability and data loss component 114 can permit the operation to occur, or otherwise ensure that the operation is carried out.

After operation 612, process flow 600 moves to 614, where process flow 600 ends.

Figure 7:
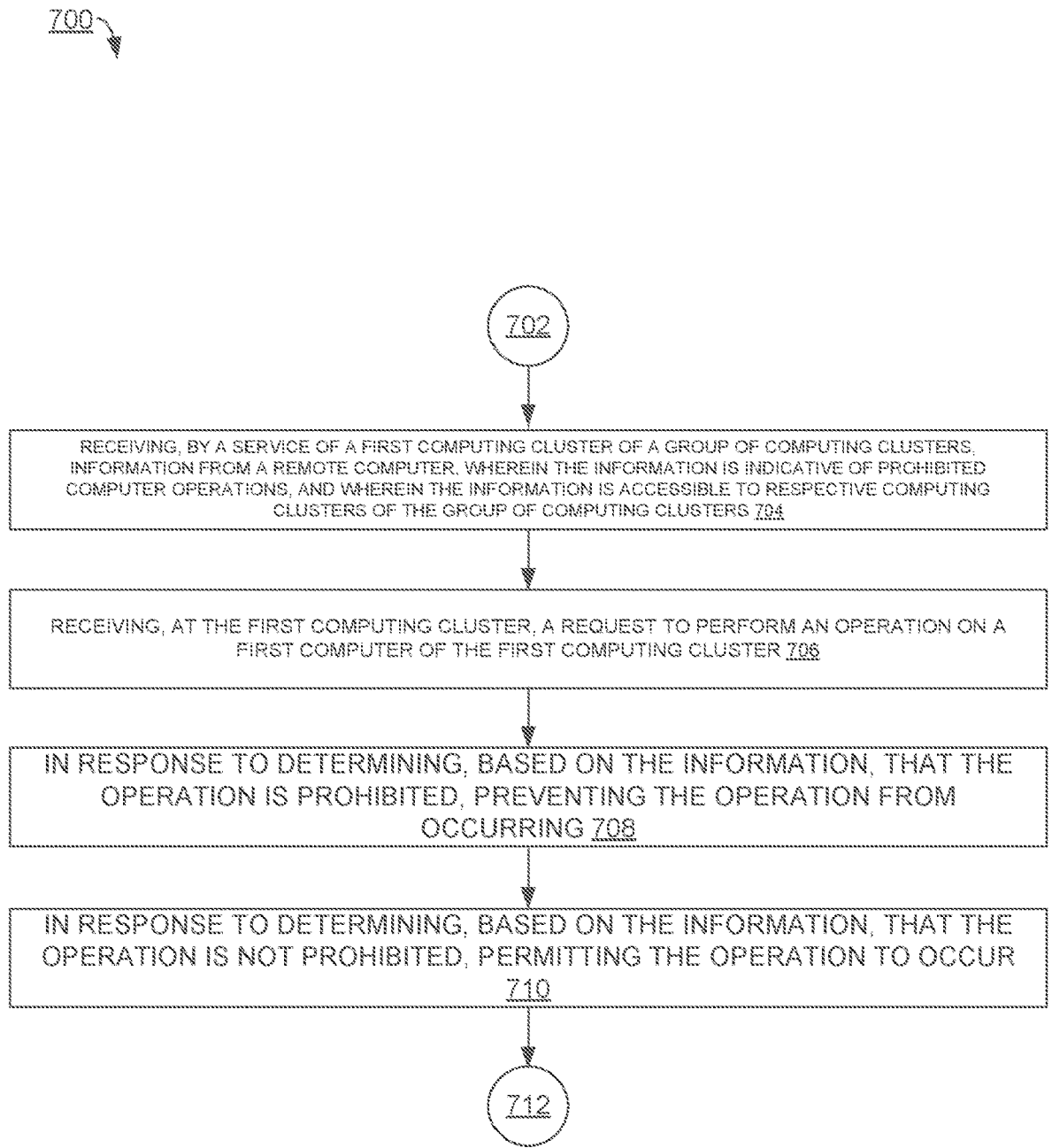
FIG. 7 illustrates an example process flow that can facilitate prevention of data unavailability and data loss, in accordance with an embodiment of this disclosure.

FIG. 7 illustrates an example process flow 700 that can facilitate prevention of data unavailability and data loss, in accordance with an embodiment of this disclosure.

In some examples, one or more embodiments of process flow 700 can be implemented by proactive prevention of data unavailability and data loss component 114 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704. Operation 704 depicts receiving, by a service of a first computing cluster of a group of computing clusters, information from a remote computer, wherein the information is indicative of prohibited computer operations, and wherein the information is accessible to respective computing clusters of the group of computing clusters. In some examples, operation 704 can be implemented in a similar manner as operation 606 of FIG. 6.

In some examples, the first computing cluster is configured to disable individual prohibitions on operations indicated by the information. That is, using the examples of FIGS. 1 and 4, local prevent table 112 can have a column for "disable check" that is not found in global prevent table 110.

In some examples, the information is generated based on a second computing cluster of the group of computing clusters. In some examples, the operation is a first operation, the information is generated based on performing a second operation on the second computing cluster, and performing the second operation resulted in data loss or data unavailability on the second computing cluster. That is, and using the example of FIG. 1, information from computing cluster B 106B can be used in creating or updating global prevent table 110. That information can then be propagated to computing cluster A 106A in local prevent table 112, where it is used to make determinations about prohibiting operations for computing cluster A 106A.

In some examples, the information indicates that the operation comprises an upgrade of a program version, a starting version of the upgrade, and a destination version of the upgrade, the information indicates an optional condition under which the upgrade is prohibited, and the information comprises an error message associated with prohibiting the upgrade. That is, and using the example of FIG. 3, a prohibition on an upgrade can indicate "on version," "to version," "condition," and "error string for customer."

In some examples, the service is a first service, the information indicates an optional condition under which the operation is prohibited, the information indicates that the operation comprises a second service being instantiated, a version of a program of the first computer that corresponds to the operation, and an error message associated with prohibiting the operation. That is, and using the example of FIG. 3, a prohibition on a configuration for a service can indicate "on version," "condition," and "error string for customer."

After operation 704, process flow 700 moves to operation 706.

Operation 706 depicts, in response to receiving, at the first computing cluster, a request to perform an operation on a first computer of the first computing cluster. In some examples, operation 706 can be implemented in a similar manner as operation 608 of FIG. 6.

After operation 706, process flow 700 moves to operation 708.

Operation 708 depicts, in response to determining, based on the information, that the operation is prohibited, preventing the operation from occurring. In some examples, operation 708 can be implemented in a similar manner as operation 610 of FIG. 6.

After operation 708, process flow 700 moves to operation 710.

Operation 710 depicts, in response to determining, based on the information, that the operation is not prohibited, permitting the operation to occur. In some examples, operation 710 can be implemented in a similar manner as operation 612 of FIG. 6.

In some examples, a second computing cluster of the group of computing clusters is configured to disable utilizing the information in performing operations. That is, a computing cluster can disable use of local prevent table 112 entirely.

After operation 710, process flow 700 moves to 712, where process flow 700 ends.

Figure 8:
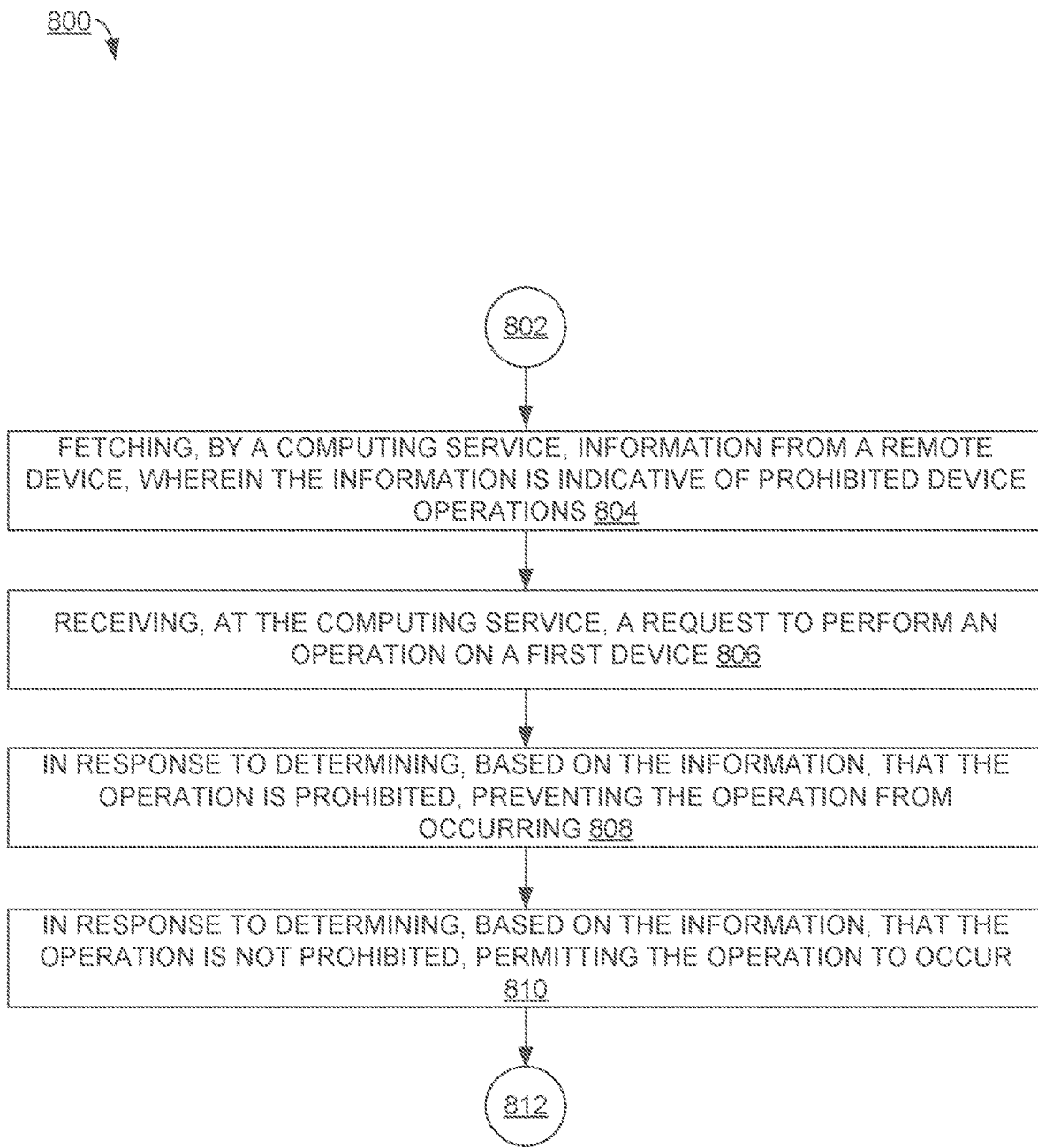
FIG. 8 illustrates an example process flow that can facilitate prevention of data unavailability and data loss, in accordance with an embodiment of this disclosure.

FIG. 8 illustrates an example process flow 800 that can facilitate prevention of data unavailability and data loss, in accordance with an embodiment of this disclosure.

In some examples, one or more embodiments of process flow 800 can be implemented by proactive prevention of data unavailability and data loss component 114 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804. Operation 804 depicts fetching, by a computing service, information from a remote device, wherein the information is indicative of prohibited device operations. In some examples, operation 804 can be implemented in a similar manner as operation 606 of FIG. 6.

In some examples, the computing service comprises a computing daemon.

After operation 804, process flow 800 moves to operation 806.

Operation 806 depicts receiving, at the computing service, a request to perform an operation on a first device. In some examples, operation 806 can be implemented in a similar manner as operation 608 of FIG. 6.

After operation 806, process flow 800 moves to operation 808.

Operation 808 depicts, in response to determining, based on the information, that the operation is prohibited, preventing the operation from occurring. In some examples, operation 808 can be implemented in a similar manner as operation 610 of FIG. 6.

After operation 808, process flow 800 moves to operation 810.

Operation 810 depicts, in response to determining, based on the information, that the operation is not prohibited, permitting the operation to occur. In some examples, operation 810 can be implemented in a similar manner as operation 612 of FIG. 6.

After operation 810, process flow 800 moves to 812, where process flow 800 ends.

Figure 9:
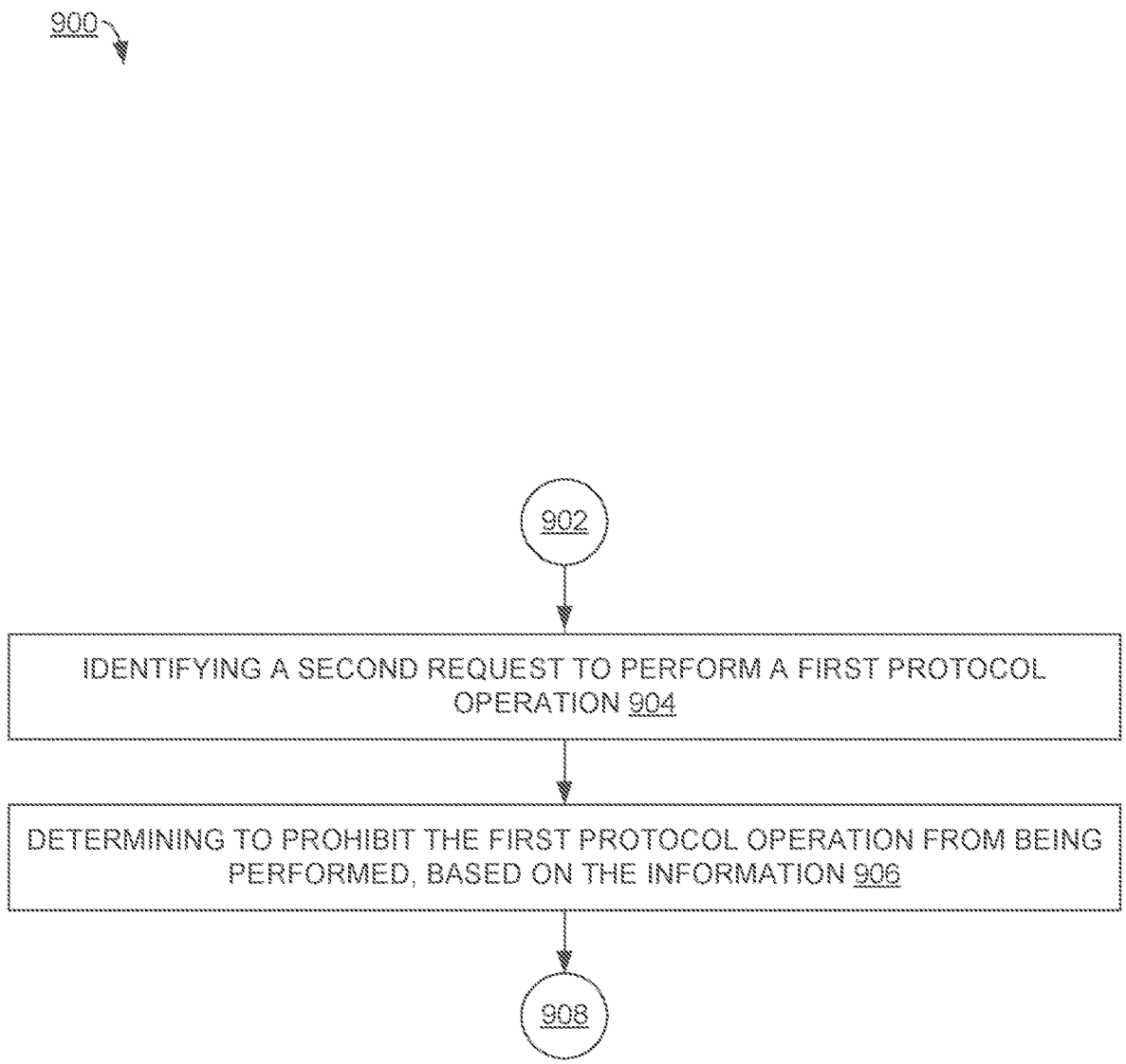
FIG. 9 illustrates an example process flow that can facilitate prevention of data unavailability and data loss, in accordance with an embodiment of this disclosure.

FIG. 9 illustrates an example process flow 900 that can facilitate prevention of data unavailability and data loss, in accordance with an embodiment of this disclosure.

In some examples, one or more embodiments of process flow 900 can be implemented by proactive prevention of data unavailability and data loss component 114 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904. Operation 904 depicts identifying a second request to perform a first protocol operation. This protocol operation can be, for example, a server message block (SMB) protocol operation to read or write data, or a network file system (NFS) protocol operation to read or write data.

In some examples, the request is directed to a protocol driver, and the request is identified utilizing a filter driver hook at the protocol driver.

After operation 904, process flow 900 moves to operation 906.

Operation 906 depicts determining to prohibit the first protocol operation from being performed, based on the information. The information can be similar to local prevent table 112 of FIG. 1, and can be used in a similar manner as described with respect to operations 610-612 of FIG. 6.

After operation 906, process flow 900 moves to 908, where process flow 900 ends.

Figure 10:
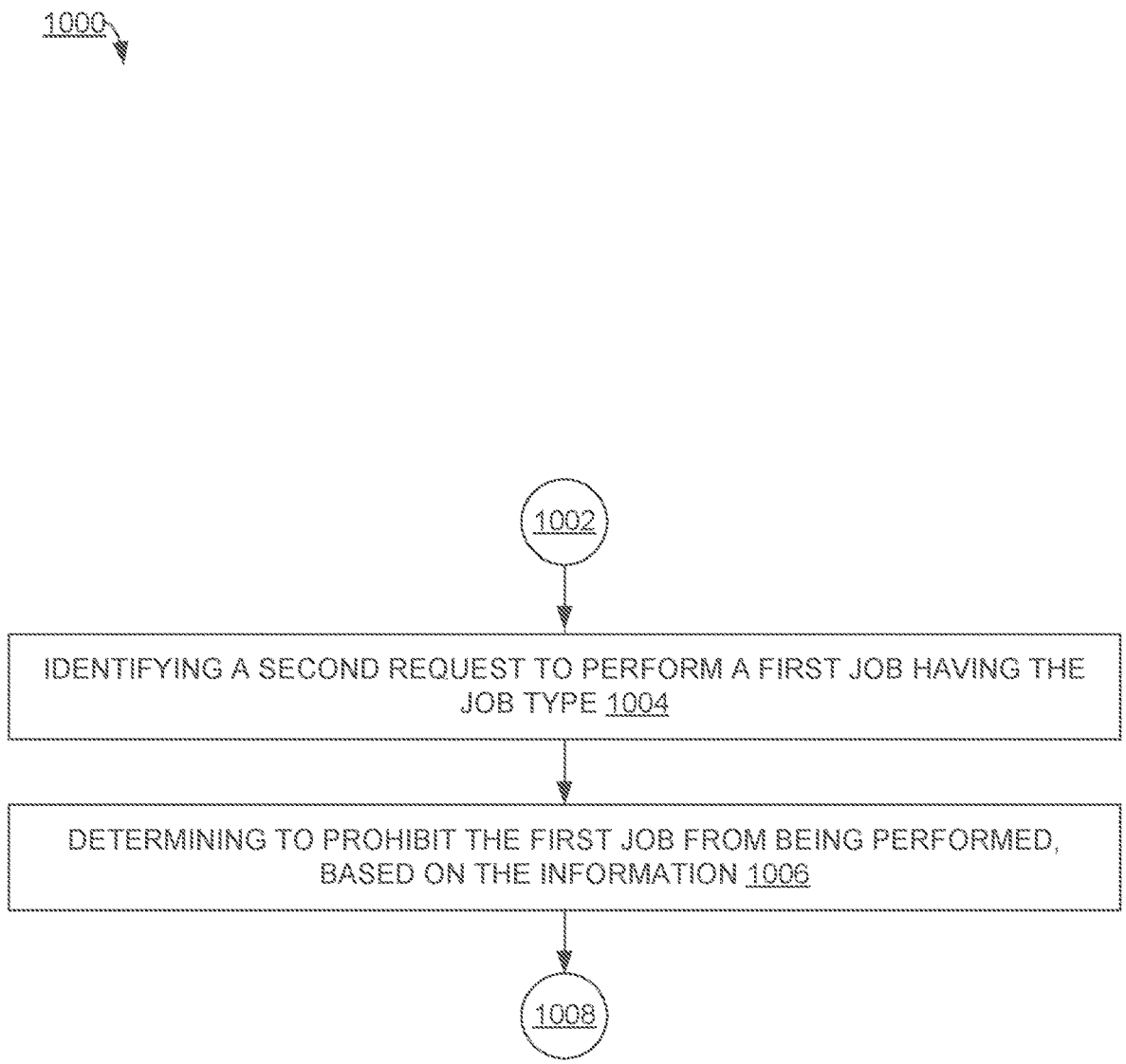
FIG. 10 illustrates an example process flow that can facilitate prevention of data unavailability and data loss, in accordance with an embodiment of this disclosure.

FIG. 10 illustrates an example process flow 1000 that can facilitate prevention of data unavailability and data loss, in accordance with an embodiment of this disclosure.

In some examples, one or more embodiments of process flow 1000 can be implemented by proactive prevention of data unavailability and data loss component 114 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004. Operation 1004 depicts identifying a second request to perform a first job having the job type. A job can be an amount of work to perform by the computing cluster, where the job has a particular type associated with it.

In some examples, the request is directed to a job engine, and the request is identified utilizing a filter driver hook at the job engine.

After operation 1004, process flow 1000 moves to operation 1006.

Operation 1006 depicts determining to prohibit the first job from being performed, based on the information. The information can be similar to local prevent table 112 of FIG. 1, and can be used in a similar manner as described with respect to operations 610-612 of FIG. 6.

After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of node A 102A, node B 102B, node C 102C, and/or node D 102D of FIG. 1.

In some examples, computing environment 1100 can implement one or more embodiments of the process flows of FIGS. 5-10 to facilitate proactive prevention of data unavailability and data loss.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      maintaining information indicative of prohibited computer operations, wherein the information is accessible to respective computing clusters of a group of computing clusters, and wherein the information is stored separately from the group of computing clusters;
      obtaining, by a service of a computing cluster of the group of computing clusters, the information;
      receiving, at the computing cluster, a request to perform an operation on a computer of the computing cluster,
         in response to determining, based on the information, that the operation is prohibited, preventing the operation from occurring, and
         in response to determining, based on the information, that the operation is not prohibited, permitting the operation to occur.

2. The system of claim 1, wherein the operation is prohibited because performing the operation results in at least one of data unavailability or data loss.

3. The system of claim 1, wherein the operation comprises upgrading from a first version of a program on the computer to a second version of the program on the computer.

4. The system of claim 1, wherein the information indicates a condition under which the operation is prohibited.

5. The system of claim 4, wherein the service is a first service, and wherein the condition is a second service that is running on the computer.

6. The system of claim 1, wherein the information indicates that the operation is prohibited, and wherein the information indicates a message to convey to a user account that initiated the operation.

7. The system of claim 1, wherein the service is a first service, and wherein the operation comprises instantiating a second service on the computer.

8. A method, comprising:
   receiving, by a service of a first computing cluster of a group of computing clusters, information from a remote computer, wherein the information is indicative of prohibited computer operations, and wherein the information is accessible to respective computing clusters of the group of computing clusters; and
   receiving, at the first computing cluster, a request to perform an operation on a computer of the first computing cluster,
      in response to determining, based on the information, that the operation is prohibited, preventing the operation from occurring, and
      in response to determining, based on the information, that the operation is not prohibited, permitting the operation to occur.

9. The method of claim 8, wherein the first computing cluster is configured to disable individual prohibitions on operations indicated by the information.

10. The method of claim 8, wherein a second computing cluster of the group of computing clusters is configured to disable utilizing the information in performing operations.

11. The method of claim 8, wherein the information is generated based on a second computing cluster of the group of computing clusters.

12. The method of claim 11, wherein the operation is a first operation, wherein the information is generated based on performing a second operation on the second computing cluster, and wherein performing the second operation resulted in data loss or data unavailability on the second computing cluster.

13. The method of claim 8, wherein the information indicates that the operation comprises an upgrade of a program version, a starting version of the upgrade, and a destination version of the upgrade, wherein the information indicates an optional condition under which the upgrade is prohibited, and wherein the information comprises an error message associated with prohibiting the upgrade.

14. The method of claim 8, wherein the service is a first service, wherein the information indicates an optional condition under which the operation is prohibited, and wherein the information indicates that the operation comprises a second service being instantiated, a version of a program of the computer that corresponds to the operation, and an error message associated with prohibiting the operation.

15. A non-transitory computer-readable medium comprising instructions that, in response to execution, cause a system comprising a processor and executing a computing service to perform operations, comprising:
   fetching, by the computing service, information from a remote device, wherein the information is indicative of prohibited device operations; and
   receiving, at the computing service, a request to perform an operation on a first device,
      in response to determining, based on the information, that the operation is prohibited, preventing the operation from occurring, and
      in response to determining, based on the information, that the operation is not prohibited, permitting the operation to occur.

16. The non-transitory computer-readable medium of claim 15, wherein the computing service comprises a computing daemon.

17. The non-transitory computer-readable medium of claim 15, wherein the request is a first request, wherein the information indicates a prohibited protocol operation, and wherein the operations further comprise:
   identifying a second request to perform a protocol operation; and
   determining to prohibit the protocol operation from being performed, based on the information.

18. The non-transitory computer-readable medium of claim 17, wherein the request is directed to a protocol driver, and wherein the request is identified utilizing a filter driver hook at the protocol driver.

19. The non-transitory computer-readable medium of claim 15, wherein the request is a first request, wherein the information indicates a job type, and wherein the operations further comprise:
   identifying a second request to perform a job having the job type; and
   determining to prohibit the job from being performed, based on the information.

20. The non-transitory computer-readable medium of claim 19, wherein the request is directed to a job engine, and wherein the request is identified utilizing a filter driver hook at the job engine.

* * * * *